United States Patent Office 3,220,971
Patented Nov. 30, 1965

3,220,971
POLYETHYLENE CONTAINING DIOCTYL PHOSPHATE OR OCTYLDIPHENYL PHOSPHATE
Francis Barillet, Clichy, and Marie Genier, Levallois, France, assignors to Manufactures de Produits Chimiques du Nord Etablissements Kuhlmann, Paris, France, a corporation of France
No Drawing. Filed Sept. 29, 1961, Ser. No. 141,583
Claims priority, application France, Mar. 22, 1961, 856,501
2 Claims. (Cl. 260—45.7)

This invention relates to the preparation of odorless ethylene polymer and copolymer products.

While it is usually desirable that a plastic material should be completely odorless at any rate in its final form, it has not always been found possible heretofore to control or avoid the occurrence of smell in polyethylene copolymer articles. This of course is especially objectionable in certain fields such as polyethylene sheet for packaging food and other products, polyethylene household utensils, and various other uses.

Thus it has been found that many polyethylene compositions containing metal compounds deliberately incorporated in them as catalysts or for other purposes, or present as impurities in the stock, tend to develop an unpleasant smell during the extrusion, moulding or other high-temperature shaping stage, and the smell will persist in the finished articles.

This smell has usually been attributed to the reaction products of the metal compounds with the polymer itself and/or anti-oxidant or stabilizing agents used therein for stabilizing the articles against the actions of atmospheric oxygen and light. For example, polyethylene produced with chromium oxide on a silica-alumina carrier as the catalyst and stabilized with an anti-oxidant usually still contains traces of catalyst, which may be as low as 0.05% or less. During the manufacture of shaped articles from such a polyethylene composition, an unpleasant and persistent ordor frequently develops.

It is an object of this invention to prepare polyethylene and ethylene copolymer products that will be wholly or substantially odorless. An object is to control the formation of persistent odor-generating by-products during the manufacturing process of polyethylene and ethylene-copolymer articles.

The invention is based on the unexpected discovery that the incorporation of organic phosphates, in the polyethylene or ethylene copolymer compositions, will prevent the formation of odor-generating by products even where the composition contains residual metallic compounds, anti-oxidizers and the like.

It will be understood that in the ensuing disclosure and claims, the expression polyethylene will be used to include, where applicable, both polymers of ethylene and copolymers of ethylene with other compounds.

The invention accordingly comprises the method of producing substantially odorless polyethylene products, which method is characterized by the step of including a small proportion of one or more organic phosphates in the polyethylene composition. The invention likewise includes the polyethylene products and shaped articles produced by the specified method.

Preferably the addition of organic phosphate is made prior to the addition of anti-oxidant or other stabilizer agents into the composition. In one advantageous form of the invention, the stabilizer agent, if soluble, is dissolved or otherwise dispersed in a selected liquid organic phosphate, and the solution or dispersion is added to the polyethylene composition. Alternatively, a suitable compatible solvent may be added to a mixture of organic phosphate and stabilizer, and the resulting solution added to the polyethylene. The auxiliary solvent may, if desired, be selected sufficiently volatile for ready elimination thereof from the composition.

A wide range of organic phosphates, including both neutral and acidic salts, may be used according to the invention. In many cases, of course, limitations on the nature of the usable phosphate will be imposed by practical considerations and primarily by the final use to which the products are to be put. Thus, where the polyethylene article is to be used in connection with food, the phosphates should be selected from within the group of innocuous organic phosphates approved by the competent sanitary agencies. One example of an organic phosphate usable according to the invention in such cases, is octyldiphenyl-phosphate.

The organic phosphates may be incorporated in the composition in a wide range of proportions for the purposes of the invention. Preferably the proportion is in the range of from 0.002% to 1% by weight of the polyethylene.

The organic phosphate may be added to the molten polymer, e.g., within a temperature range from 150 to 200° C. by any suitable mechanical or other means, e.g., in a ribbon machine, a roller mill, an internal mixer, or otherwise.

While the true reason for the beneficial action of the phosphates according to the invention has not been accounted for with certainty, one plausible broad explanation is that the phosphates form into complexes with any metal compounds present in the polyethylene composition, and thereby prevent subsequent reaction of said compounds with the polymer and/or the stabilizer and/or anti-oxidizer agent, even under the high-temperature conditions encountered during the shaping stage.

Some exemplary embodiments of the invention will now be described for purposes of illustration but not of limitation.

*Example I*

A polyethylene composition was prepared by a conventional process with chromium oxide on silica-aluminia carried as a catalyst. The catalyst was retained in the polymer composition, in an amount representing about 0.2% by weight of the polymer. To 100 grams of the polyethylene composition there was incorporated 0.1 g. of the anti-oxidant sold as "Ionol" (2,6-ditert-butyl-4-methyl-phenol), using a roller mill at 150° C. The resulting stabilized polymer composition was ground and moulded into plates in a molding press in which the press pot was heated to about 250° C.

The resulting plates had a disagreeable odor which persisted for many weeks, especially when stored in a confined space.

*Example II*

A polyethylene composition was similarly prepared with chromium oxide on silica-alumina as a catalyst. The catalyst was retained in the composition, in an amount of about 0.2% by weight of the polymer. To 100 grams of the composition there was then incorporated according to the invention 0.25 g. octyldiphenyl-phosphate, using a roller mill at 150° C. Thereafter 0.1 grams of "Ionol" anti-oxidant were incorporated by the same procedure. The resulting polymer composition was ground and moulded into plates by the same procedure as in Example I.

The plates were found not to possess any perceptible smell even when stored in confined conditions.

*Example III*

In an internal mixer operated at a temperature of 150° C. 0.5 g. octyldiphenylphosphate was incorporated in 100 g. of an ethylene-butene-1 copolymer containing 0.5 g. chromium oxide on silica-alumina as a catalyst. 0.1 g. of "Ionol" antioxidant was then incorporated in the mix. Plates were moulded from the composition as above, and were found to be completely odorless even under confined conditions.

*Example IV*

In an internal mixer operated at a temperature of 150° C., 0.1 g. dioctylphosphate was mixed into 100 g. of a polyethylene composition containing 0.1 g. of the catalyst chromium oxide on silica-alumina. 0.1 g. "Ionol" antioxidant was added to the mix. Plates were formed from the composition as above, and again were found completely devoid of smell even when stored in a confined space.

What we claim is:

1. A substantially odorless low pressure polyethylene resin having metallic impurities and 0.002 to 1.0% by weight of the said resin of a phosphate selected from the group consisting of octyldiphenyl phosphate and dioctyl phospate.

2. A substantially odorless low pressure ethylene-lower alkene copolymer having metallic impurities and 0.002 to 1.0% by weight of the copolymer of a phosphate selected from the group consisting of octyldiphenyl phosphate and dioctylphosphate.

References Cited by the Examiner
UNITED STATES PATENTS

| | | | |
|---|---|---|---|
| 2,825,721 | 3/1958 | Hogan et al. | 260—683.15 |
| 2,952,658 | 9/1960 | Pfeifer et al. | 260—45.7 |
| 2,980,964 | 4/1961 | Dilke | 260—30.6 |
| 2,985,617 | 5/1961 | Salyer et al. | 260—45.7 |
| 3,020,258 | 2/1962 | Robbins | 260—45.95 |

LEON J. BERCOVITZ, *Primary Examiner.*

MILTON STERMAN, *Examiner.*